L. J. KOZUB.
ADJUSTABLE BEARING.
APPLICATION FILED JULY 21, 1920.
1,361,471.
Patented Dec. 7, 1920.
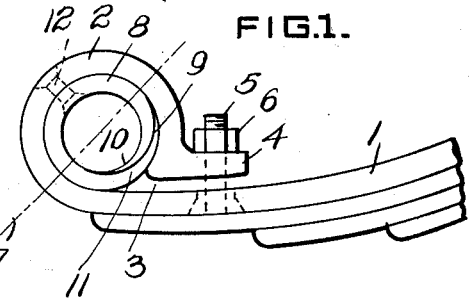
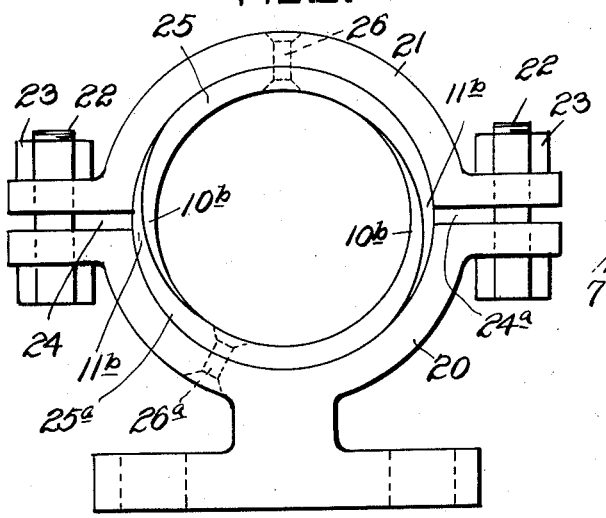
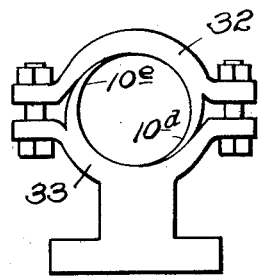
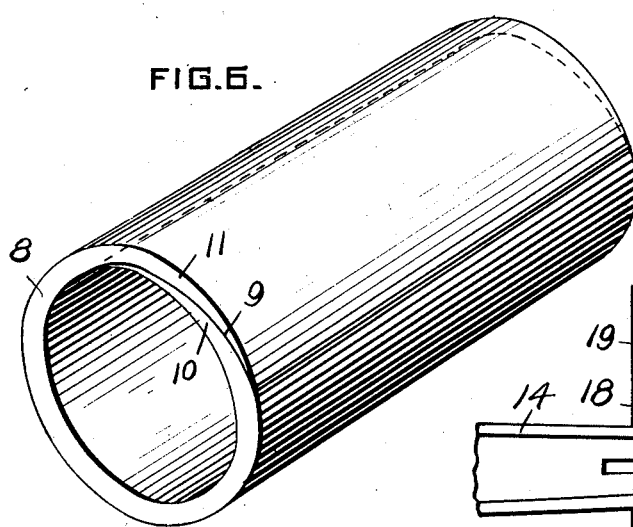
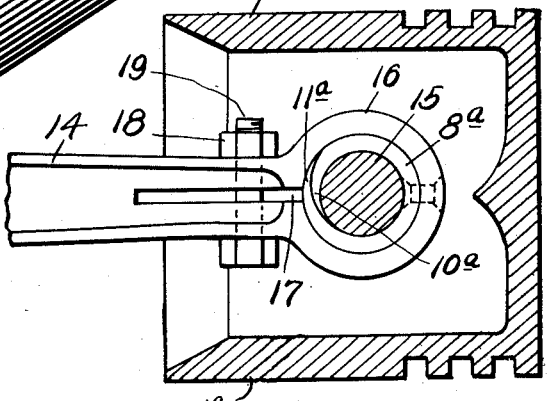
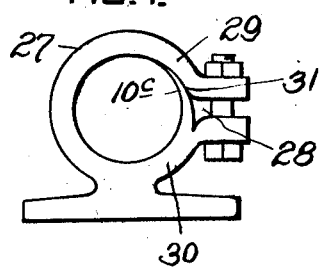
INVENTOR
Louis J. Kozub
by Winter & Brown
his attorneys.

UNITED STATES PATENT OFFICE.

LOUIS J. KOZUB, OF PITTSBURGH, PENNSYLVANIA.

ADJUSTABLE BEARING.

1,361,471.  Specification of Letters Patent.  Patented Dec. 7, 1920.

Application filed July 21, 1920. Serial No. 397,836.

*To all whom it may concern:*

Be it known that I, LOUIS J. KOZUB, a resident of Pittsburgh, in the county of Allegheny and State of Pennsylvania, have invented a new and useful Improvement in Adjustable Bearings, of which the following is a specification.

The invention relates to adjustable bearings for spindles, shafts, etc., in which the bearing housings are divided and spaced apart in a plane longitudinally of the axis of the bearings so that the housing may be drawn together at such plane of division for the purpose of compensating for wear. In the usual forms of bearings of the character stated, the adjustment of the housing results in a diminution of the diameter of the cylindrical bearing surface in a plane passing through the center of the bearing at right angles to the plane of division of the housing without a corresponding reduction in diameter in a plane coincident with the division in the housing. The object of the invention is to provide an adjustable bearing in which compensation for wear will be effected in a plane coincident with that of the division in the housing, as well as at right angles thereto.

The invention is illustrated in the accompanying drawing of which Figures 1, 2, 3, and 4 are end views of various forms of adjustable bearings embodying the invention; Fig. 5 a longitudinal central sectional view through a piston showing the bearing of a connecting rod pivotally attached to the piston; and Fig. 6 a perspective view of a form of bushing adapted to be used in bearings embodying the invention.

The adjustable bearing constructed according to the invention includes a housing of interior cylindrical form divided and spaced apart in a plane longitudinally of the axis of the bearing, and a tapered tongue adjacent to the plane of division and movable toward the center of the housing when the housing is adjusted to compensate for wear by drawing it together at its plane of division. The invention is applicable to bearings in which the housings are divided in one plane, or in two planes which are substantially diametrically opposite to each other, and to bearings with or without bushings.

In Fig. 1 the invention is illustrated in its applicability to a bushing shackle-bearing for spring eyebolts of the general type usually employed in the springs of automobiles or like vehicle. The long leaf 1 of the spring, or a special plate attached to it, is provided at its end with a loop forming an integral annular housing 2 which is divided and spaced apart as at 3 for the purpose of adjustment. The housing is provided with a lug 4 through which there extends a bolt 5, the head of which is anchored in the spring plate 1, the arrangement being such that, by drawing downwardly a nut 6 on the bolt 5, the internal dimension of the housing will be diminished principally in the direction indicated by the dot-and-dash line 7. The tapered tongue provided for diminishing the internal diameter of the bearing in a direction at right angles to the line 7 is formed in this instance by longitudinally splitting the annular bushing 8 in the manner indicated by the line 9 to form inner and outer overlapping wedge shaped tongues 10 and 11. The bushing 8 and the manner in which it is split to form the overlapping tongues are illustrated to enlarged scale in Fig. 6. The bushing is suitably held against rotation with relation to the housing 2, as by means of counter-sunk rivets 12.

When the nut 6 is screwed downwardly upon the bolt 5 to cause the lug 4 and the portion of the bearing 2 adjacent thereto to move toward the plate 1, the outer tongue 11 will slide upon the inner face of the housing and press the inner tongue 10 inwardly toward the center of the bearing. Thus the internal diameter of the bushing 8 becomes diminished in planes at right angles to each other. Specifically it becomes diminished in the plane indicated by the line 7 chiefly by the flexure of the housing 2 at and adjacent to the position in which the rivet 12 is indicated, and it becomes diminished in a plane at right angles to that indicated by line 7 by reason of the inward movement of the bushing tongue 10.

Substantially the same construction is illustrated in Fig. 5 which shows a piston 13 for an internal combustion or other type of engine attached to a connecting rod 14. The wrist pin 15 of the piston is engaged by the end of the connecting rod which is formed into a housing 16 split on one side as at 17. A bushing 8ª is arranged within, and attached to, the housing 16, and is split to form tongues 10ª and 11ª corresponding in form and functions to the tongues 10 and 11 of Fig. 1. The bearing may be adjusted by tightening a nut 18 on a bolt 19 extending through the connecting rod adjacent to the housing portion 16 thereof, with the same result as explained with reference to the bearing of Fig. 1.

In bushing bearings the housing may be divided on both sides of the bearing axis, and a two-part bushing may be provided, as indicated in the form shown in Fig. 2. The bearing there illustrated includes a pillow-block housing having a lower portion 20 and upper portion 21 clamped together by bolts 22 and nuts 23, the housing parts being spaced apart as at 24 and 24ª. The bushing is formed in two sections 25 and 25ª each attached to one of the housing portions as by rivets 26 and 26ª. These bushing sections are somewhat larger than half cylinders and have tapered edges which form over-lapping tongues 10ᵇ and 11ᵇ arranged adjacent to the planes of separation 24 and 24ª of the housing. By tightening the nuts 23 on bolts 22 the upper housing section 21 is moved toward the lower housing section 20 with the result that both the vertical and horizontal dimensions of the bushing are diminished, the latter being diminished by reason of the inward movements of the tapered tongues 10ᵇ.

In Fig. 4 there is illustrated an integral annular bearing in which the housing itself forms the bearing surface for a spindle or shaft. The housing 27 is divided at 28 so as to form what may be designated as upper and lower sections 29 and 30, respectively, adapted to be drawn toward each other by a clamping bolt. The tapered wear-compensating tongue 10ᶜ is in this instance formed as a part of the housing section 30, the housing section 29 having a wedging surface 31 formed adjacent to the outer face of the tongue 10ᶜ. Thus, when the clamping bolt is tightened, the wedging surface 31 presses inwardly the tongue 10ᶜ in a manner similar to that explained above with reference to the tongue of the split ring bushings.

As shown in Fig. 5, the general construction of the bearing of Fig. 4 is applicable to bearings having two-part housings of the type illustrated in Fig. 2. In the bearing of Fig. 5 the upper housing section 32 has integrally formed therewith a tapered tongue 10ᵈ and housing section 33 a tongue 10ᵉ. The outer faces of these tongues bear upon wedging surfaces formed on the housing sections 32 and 33 so that when the housing is adjusted for wear the tongues will spring inwardly.

It is characteristic of all of the embodiments of the invention shown herein that a tapered tongue is arranged adjacent to the divided portion of the bearing housing in such a manner as to be wedged inwardly when the housing is adjusted to compensate for wear. In some embodiments of the invention the tongues are formed by longitudinally splitting a cylindrical bushing, and in other embodiments the tongues are formed integrally with the housings. However, in each instance, the same general result is attained.

According to the provisions of the patent statutes, I have described the principle and operation of my invention together with several embodiments thereof. However, I desire to have it understood that, within the scope of the appended claims, the invention is applicable to other forms of bearings than those specifically shown and described, and to bearings for different purposes and having different supporting connections than those shown and described.

I claim:

1. An adjustable bearing, comprising an annular housing divided and spaced apart in a plane longitudinally thereof, means for adjusting the housing at said plane of division, and a tapered tongue adjacent to said plane of division and movable toward the center of the housing when the housing is adjusted to compensate for wear.

2. An adjustable bearing, comprising an annular housing divided and spaced apart in a plane longitudinally thereof, a bushing within said housing and held against rotation with relation thereto, said bushing being split longitudinally and having overlapping tapered ends adjacent to said plane of division of the housing, and means for adjusting said housing at said plane of division whereby the inner overlapping tongue of the bushing moves toward the center of the housing to compensate for wear.

3. An adjustable bearing, comprising an annular housing divided and spaced apart in a plane longitudinally thereof, a cylindrical bushing within and attached to the housing, said bushing being split longitudinally and having overlapping tapered ends adjacent to said plane of division of the housing, and a clamping bolt for adjusting said housing at said plane of division whereby the inner overlapping tongue of the bushing moves toward the center of the housing to compensate for wear.

4. An adjustable bearing, comprising an integral annular housing divided and spaced apart at one side in a plane longitudinally thereof, a cylindrical bushing within said housing and held against rotation with relation thereto, said bushing being split longitudinally and having overlapping tapered ends adjacent to said plane of division of the housing, and means for adjusting said housing at said plane of division thereof.

In testimony whereof, I have hereunto set my hand.

LOUIS J. KOZUB.

Witness:
PAUL N. CRITCHLOW.